E. R. PHILIP.
APRON AND CUP SUPPORTING DEVICE.
APPLICATION FILED JUNE 8, 1912.
1,091,698.
Patented Mar. 31, 1914.
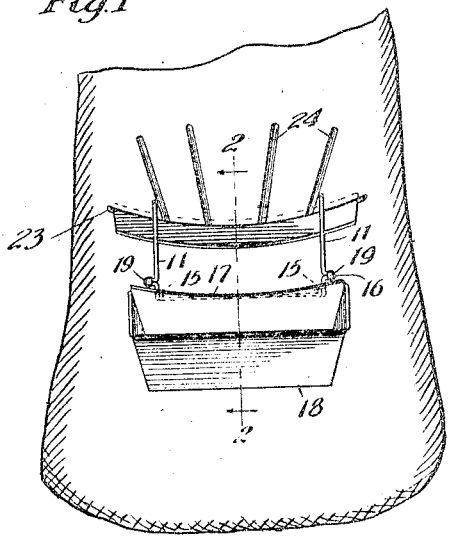
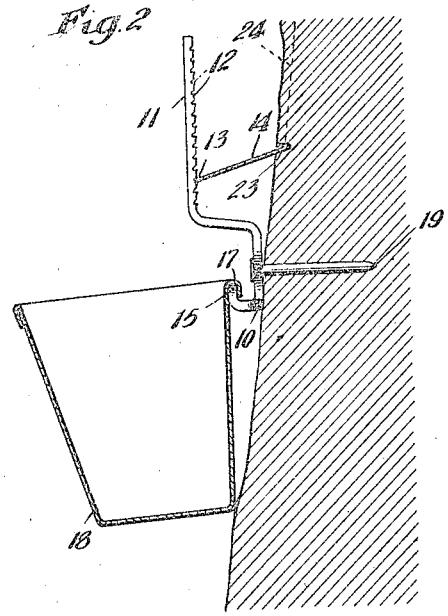
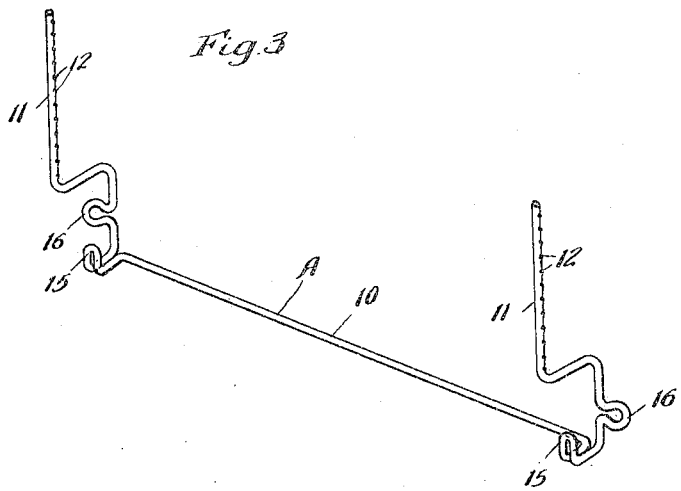
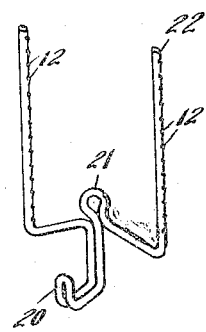
Witnesses:
Inventor:
Ernest R. Philip
By Munday, Evarts, Adcock & Clarke
Attys

UNITED STATES PATENT OFFICE.

ERNEST R. PHILIP, OF ATLANTA, GEORGIA, ASSIGNOR TO AMERICAN CAN COMPANY, OF NEW YORK, N. Y., A CORPORATION OF NEW JERSEY.

APRON AND CUP SUPPORTING DEVICE.

1,091,698.　　　　Specification of Letters Patent.　　Patented Mar. 31, 1914.

Application filed June 8, 1912.　Serial No. 702,470.

*To all whom it may concern:*

Be it known that I, ERNEST R. PHILIP, a citizen of the United States, residing in Atlanta, in the county of Fulton and State of Georgia, have invented a new and useful Improvement in Apron and Cup Supporting Devices, of which the following is a specification.

This invention relates to improvements in combined sap apron and cup supporting devices, and relates more particularly to devices of the type indicated which are used in collecting turpentine by the cupping method, as distinguished from the box cutting method, although the improvements are susceptible of use in other ways, as will be obvious to those skilled in the art.

It has formerly been customary to support the aprons and collecting cups used in gathering sap from trees in either of two ways, the first of which consists in sustaining the weight of the cup and contents by means of nails or similar devices driven into the tree and on which the cups rest, and having the aprons stuck into a cut in the tree and supported in that manner; and the second of which consists in forming a deep cut in the tree and securing the apron therein and supporting the cup by the apron.

The first method described presents many objections, since it necessitates the several operations of driving in a plurality of nails at each tree, gashing the tree and inserting the apron and placing the cup, and the result is that, with unskilled labor, generally negroes employed in this work, the apron and cup are not properly placed relatively to each other, oftentimes resulting in a waste of sap, and when the cups are removed from the nails or other supporting members, the latter are left in the tree, which subsequently causes damage to the saws when the trees are being cut at the saw mills.

With the second method, above described, an excessively deep gash extending well into the body of the tree below the bark is required in order to properly hold the apron and the weight of the cup and contents, and the formation of this deep gash requires special tools and requires considerable time, and it often occurs that the cup and apron become dislodged from the tree when the cup becomes partially filled, due to the fact that the apron has been previously loosened during the operations of emptying the cups.

As is well known in this art, especially in connection with turpentine collecting, the apron and cup are moved up the tree each year for several years, and hence with the old methods of collecting the sap by cupping, as hereinbefore described, it will be seen that each year the same troubles are encountered and the objectionable features multiplied each time that the cup and apron are moved.

The object of my invention is to provide a device which will be free from all the foregoing indicated objectionable features, and which may be used with any of the common forms of apron and cup now in use, and which will materially reduce the cost of labor required to set up, allow of easy adjustment of the apron at any time relatively to the cup, absolutely prevent possibility of metal being left in the trees after the tapping of the trees has been completed, and also prevent damage or unnecessary mutilation of the tree.

The invention furthermore consists in the improvements in the parts and devices and in the novel combinations of parts and devices herein shown, described or claimed.

In the drawing forming a part of this specification, Figure 1 is a side elevation of a portion of a tree showing my improvements in connection therewith. Fig. 2 is a vertical section, taken on the line 2—2 of Fig. 1. Fig. 3 is a detail, perspective view of the improved combined apron and cup support, and Fig. 4 is a detail perspective view of a modified form of the support.

In the drawing, A denotes the combined apron and cup support, the same consisting of a horizontal portion 10 and two vertical end portions 11, 11, each of these portions being provided with an inner face having a plurality of incisions or notches 12, 12 in which the outer edge 13 of the apron 14 is adapted to be adjusted. Intermediate the horizontal portion 10 and each of the vertically extending portions 11, is provided a hook portion 15 and a loop or eye 16, the hook 15 being adapted to engage under the inner rim 17 of a cup 18, and the eyes or loops 16 being adapted to receive nails 19 and to be thereby secured to the tree. It will of course be obvious that the size of the eyes or loops 16 is such that the head of the nail cannot pass therethrough, and hence when the support A is removed from the tree, the nails 19 must necessarily be removed with the support, and thereby prevent the possibility of any metal being left in the tree before the same is cut down and shipped to the saw mills.

In Fig. 4, the modified form is shown as provided with a single hook portion 20 and a single eye or loop 21 and a pair of spaced, vertically extending portions 22, 22 adapted to engage the outer edge of the apron.

In using my invention, the barks of the trees are first provided with horizontal gouges 23 and a plurality of converging gouges 24 by a suitable tool, not shown, after which the supports are nailed in place and then the cups and aprons properly positioned, and as will be obvious, the slope of the apron may be adjusted as desired, and the outer edge will always be in proper relation to the cups, and due to the inherent resiliency of the vertically extending members of the support, the apron will be held in proper position on the tree without the necessity of gashes or cuts, such as have hitherto been customary.

Various changes and modifications may be made in the details of construction without departing from the spirit of the invention, and all such changes and variations are contemplated as fall within the scope of the claims appended hereto.

I claim:—

1. A support of the class described adapted to be secured to a tree and having two portions spaced from each other and each provided with a face adapted to engage an edge of an apron and to coöperate with the tree to retain the apron in position, substantially as specified.

2. A support of the class described comprising a member having two separated, cup supporting hooks, said member being also provided with means formed integrally therewith and located adjacent each of said hooks by which the support may be secured to a tree, substantially as specified.

3. A support of the class described adapted to be secured to a tree, and having two portions spaced from each other, each provided with a face adapted to engage an edge of an apron, and having also another portion adapted to engage and support a cup, all of said portions being integrally formed, substantially as specified.

4. A support of the class described, adapted to be secured to a tree and having two portions spaced from each other, each provided with a face adapted to engage an edge of an apron, and having also two other portions spaced from each other, adapted to engage and support a cup, all of said portions being integrally formed, substantially as specified.

5. A support of the class described, having two portions spaced from each other, each provided with a face adapted to engage an edge of an apron and an eye or loop formed integrally with said portions, said eye or loop being adapted to receive a nail, whereby the support may be attached to the tree, substantially as specified.

6. A support of the class described, having two portions spaced from each other, each provided with a face adapted to engage an edge of an apron, said support having formed integrally with said apron engaging portions, two eyes or loops spaced from each other, said eyes or loops being adapted to receive nails, whereby the support may be secured to a tree, substantially as specified.

7. A support of the class described, having two portions spaced from each other and each having a face adapted to engage an edge of an apron, said portions having integrally formed therewith a hook adapted to engage and support a cup, said portions being inherently resilient, and means on each of said faces whereby the apron may be adjusted thereon, substantially as specified.

8. A support of the class described, having two portions spaced from each other and each provided with a face adapted to engage an edge of an apron, said support having two hooks adapted to engage and support a cup, and a pair of spaced eyes or loops integrally formed with the apron engaging portions, said portions being inherently resilient, and each of said eyes being adapted to receive a nail, whereby the support may be secured to a tree, substantially as specified.

ERNEST R. PHILIP.

Witnesses:
W. HOWARD SMITH,
C. M. FALL.